US011487964B2

(12) United States Patent
Ray et al.

(10) Patent No.: US 11,487,964 B2
(45) Date of Patent: Nov. 1, 2022

(54) COMPREHENSIVE DATA SCIENCE SOLUTION FOR SEGMENTATION ANALYSIS

(71) Applicant: Dell Products L.P., Round Rock, TX (US)

(72) Inventors: Saptarshi Ray, Bengaluru (IN); Nilesh Modak, Bengaluru (IN); Ravi Hs, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 16/369,471

(22) Filed: Mar. 29, 2019

(65) Prior Publication Data

US 2020/0311472 A1    Oct. 1, 2020

(51) Int. Cl.
*G06F 16/00* (2019.01)
*G06K 9/62* (2022.01)

(52) U.S. Cl.
CPC ......... *G06K 9/6223* (2013.01); *G06K 9/6227* (2013.01); *G06K 9/6259* (2013.01); *G06K 9/6263* (2013.01)

(58) Field of Classification Search
CPC .. G06K 9/6218; G06K 9/6223; G06K 9/6227; G06K 9/6259; G06K 9/6263; G06K 9/6292
See application file for complete search history.

(56) References Cited

U.S. PATENT DOCUMENTS

| | | | | |
|---|---|---|---|---|
| 2002/0138466 | A1* | 9/2002 | Arning | G06K 9/6218 |
| 2003/0174859 | A1* | 9/2003 | Kim | G06F 16/5838 |
| | | | | 382/100 |
| 2010/0217763 | A1* | 8/2010 | Park | H04B 7/0413 |
| | | | | 707/737 |
| 2013/0077837 | A1* | 3/2013 | Gobinet | G06K 9/6218 |
| | | | | 382/128 |
| 2014/0074614 | A1* | 3/2014 | Mehanian | G06Q 30/0267 |
| | | | | 705/14.64 |
| 2014/0236950 | A1* | 8/2014 | Kim | G06F 16/285 |
| | | | | 707/737 |
| 2016/0110442 | A1* | 4/2016 | Williams | G06Q 10/0637 |
| | | | | 707/737 |
| 2018/0246883 | A1* | 8/2018 | Wang | G06F 40/295 |

(Continued)

OTHER PUBLICATIONS

Charrad et al., NbClust: An R Package for Determining the Relevant No. of Clusters in a Data Set, Journal of Statistical Software, Oct. 2014, vol. 61, Issue 6 (Year: 2014).*

(Continued)

*Primary Examiner* — Shew Fen Lin
(74) *Attorney, Agent, or Firm* — Terrile, Cannatti & Chambers, LLP; Emmanuel A. Rivera (57) ABSTRACT

A system, method, and computer-readable medium are disclosed for improved segmentation analysis. In various embodiments, an artificial learning blended algorithm (ALBA) system—is implemented. In various embodiments, the ALBA system includes an optimum cluster module to determine an optimum number of clusters for multiple clustering algorithms, and a validation cluster module to validate cluster algorithms using index validation techniques to determine a clustering algorithm from multiple clustering algorithms that use the determined optimum number of clusters.

14 Claims, 8 Drawing Sheets

(56) References Cited

U.S. PATENT DOCUMENTS

| | | | |
|---|---|---|---|
| 2019/0065577 A1* | 2/2019 | Tylenda | G06F 16/285 |
| 2019/0138597 A1* | 5/2019 | Dowell | H04L 51/16 |
| 2019/0205806 A1* | 7/2019 | Karmakar | G06Q 30/02 |
| 2019/0272333 A1* | 9/2019 | Siddiqi | G06K 9/6215 |

OTHER PUBLICATIONS

Brun et al. Model-based evaluation of clustering validation measures, Pattern Recognition 40 (2007) 807-824 (Year: 2007).*

R. Rezaee et al., A New Cluster Validity Index for the Fuzzy c-Mean, Pattern Recognition Letters, 19, 237-246, (1998), http://citeseerx.ist.psu.edu/viewdoc/download?doi=10.1.1.103 6731&rep=rep1&type=pdf.

A.K. Jain et al., Data clustering: A review, ACM Computer, Surveys 31 (3), 1999, pp. 264-32, https://www.cs.rutgers.edu/~mlittman/courses/lightai03/jain99data.pdf.

J.C. Dunn, A Fuzzy relative of the ISODATA process and its use in detecting compact well-separated clusters, Journal of Cybernetics, 3, 1974, pp. 32-57, http://www-m9.ma.tum.de/foswiki/pub/WS2010/CombOptSem/FCM.pdf.

C.H. Chou et al., A New Cluster Validity Measure for Clusters with Different Densities, Pattern Analysis Applications, 7, 2004, pp. 2005-2020, https://www.researchgate.net/publication/242111922_A_New_Cluster_Validity_Measure_for_Clusters_with_Different_Densities.

I. Gath et al., Unsupervised Optimal Fuzzy Clustering, IEEE Transactions on Pattern Analysis and Machine Intelligence, 11(7), 773-781, (1989), https://www.cse.unr.edu/~bebis/CS479/PaperPresentations/gath.pdf.

M. Halkidi et al., Quality Scheme Assessment in the Clustering Process, Proceedings of PKDD, Lyon, France, (2000), https://link.springer.com/content/pdf/10.1007%2F3-540-45372-5_26.pdf.

Raghu Krishnapuram et al., The Fuzzy C Quadric Shell Clustering Algorithms and the Detection of Second-Degree Curves, Abstract, Pattern Recognition Letters, 14(7), 545-552 (1993).

Anil K. Jain et al., Algorithms for Clustering Data, Chapters 3-4, pp. 130-148, Prentice Hall (1988).

Michael J.A. Berry et al., Data Mining Techniques For Marketing, Sales and Customer Relationship Management, Chapter 9, p. 320—Chapter 10 Link Analysis, pp. 321-336, Second Edition, Wiley Publishing, Inc. (2004).

David L. Davies et al., A Cluster Separation Measure, IEEE Transactions on Pattern Analysis and Machine Intelligence, vol. 1, No. 2, pp. 224-227 (Apr. 1979).

Raghu Krishnapuram et al., Range Image Segmentation Through Fuzzy and Possibilistic Shell Clustering, Abstract, Theory and Decision Library book series (TDLD, vol. 16) (1995).

* cited by examiner

COMPREHENSIVE DATA SCIENCE SOLUTION FOR SEGMENTATION ANALYSIS

BACKGROUND OF THE INVENTION

Field of the Invention

The present invention relates to the management of information handling systems. More specifically, embodiments of the invention provide a system, method, and computer-readable medium for improved segmentation analysis.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data science uses scientific methods, processes, algorithms and systems to extract knowledge and insight from gathered data in structured and unstructured forms. Data science provides for an ability to understand and analyze phenomena that occurs with gathered data, and can involve statistics, machine learning and other methods. Segmentation is an aspect of data science. Segmentation involves dividing up data into groups and sub-groups based on similarities. For example, in segmenting a broad group of consumers, consumers can be grouped based on shared characteristics. For businesses, segmentation of data can support various business units such as sales, marketing, customer support, finance, etc. Segmentation analysis can provide actionable insights for such business areas as described in the following examples. In marketing, customer segmentation can be implemented to identify a target account group for market campaign execution. For a product support group, product segmentation can be implemented to identify a combination of product features for product design for a specific customer segment. For financial services, segmentation can be implemented for fraud detection to identify fraudulent behavior to prevent adverse impact on business performance. For customer support, in implementing text mining, using segmentation, customer voice analysis to determine what customer are saying about products and services, where the source of data can include call logs, emails, chats, etc.

Clustering involves finding similarities in data, such as customers, so that the data can be grouped, and segmented. Clustering is the process of using machine learning algorithms to identify how different types of data are related and creating new segments based on those relationships. Clustering finds the relationship between data points so they can be segmented. Typically, an analysis using clustering starts with separate algorithms that are selected for separate analytical tasks and develop separate solutions. The clustering process can be time consuming and involve repetitive efforts. In many instances, implementing segmentation performed by personnel experienced with the algorithms and with knowledge of expected results. Unfortunately, in most cases, the knowledge and experience of such personnel is not shared with others. There is a desire to be able to implement data science and particularly segmentation into a valuable commercial product to support businesses. Productization involves implementation of concepts into valuable tools. Productization of segmentation can allow businesses to gain valuable insight and leverage the use of data.

SUMMARY OF THE INVENTION

A system, method, and computer-readable medium are disclosed for improved segmentation analysis. In various embodiments, an artificial learning blended algorithm (ALBA) system-is implemented that includes a system includes an optimum cluster module and validation cluster module. The optimum cluster module determines an optimum number of clusters for multiple clustering algorithms, multiple clustering algorithms are performed using the determined optimum number of clusters, and the validation cluster module validates the cluster algorithms using index validation techniques to determine the best clustering algorithm.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for customer segmentation analysis. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
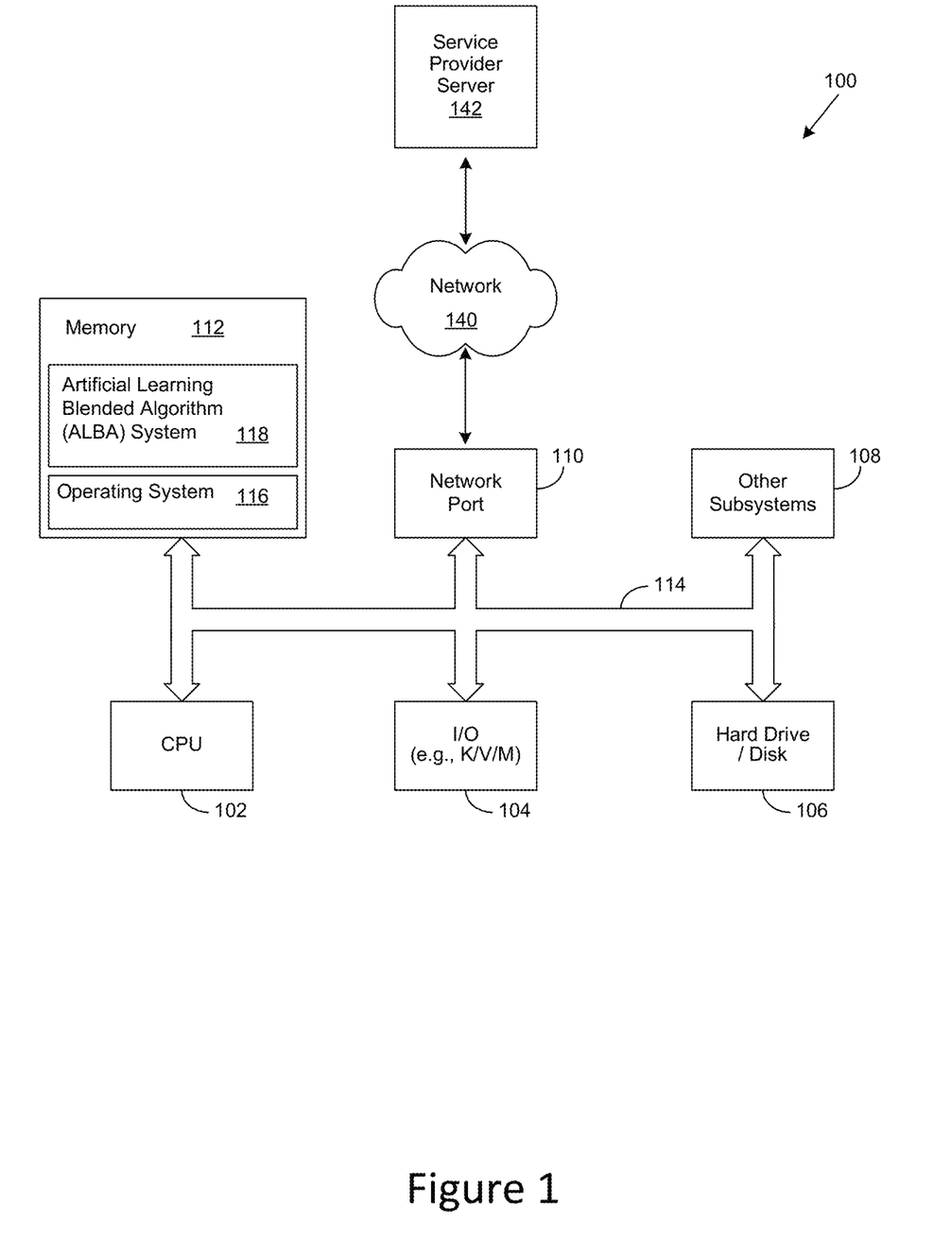
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include an artificial learning blended algorithm (ALBA) system 118. In certain embodiments, the ALBA system 118 is configured to support multiple users, data repositories, products, and/or services. In certain implementations, the ALBA system 118 is provided as a service from the service provider server 142.

Figure 2:
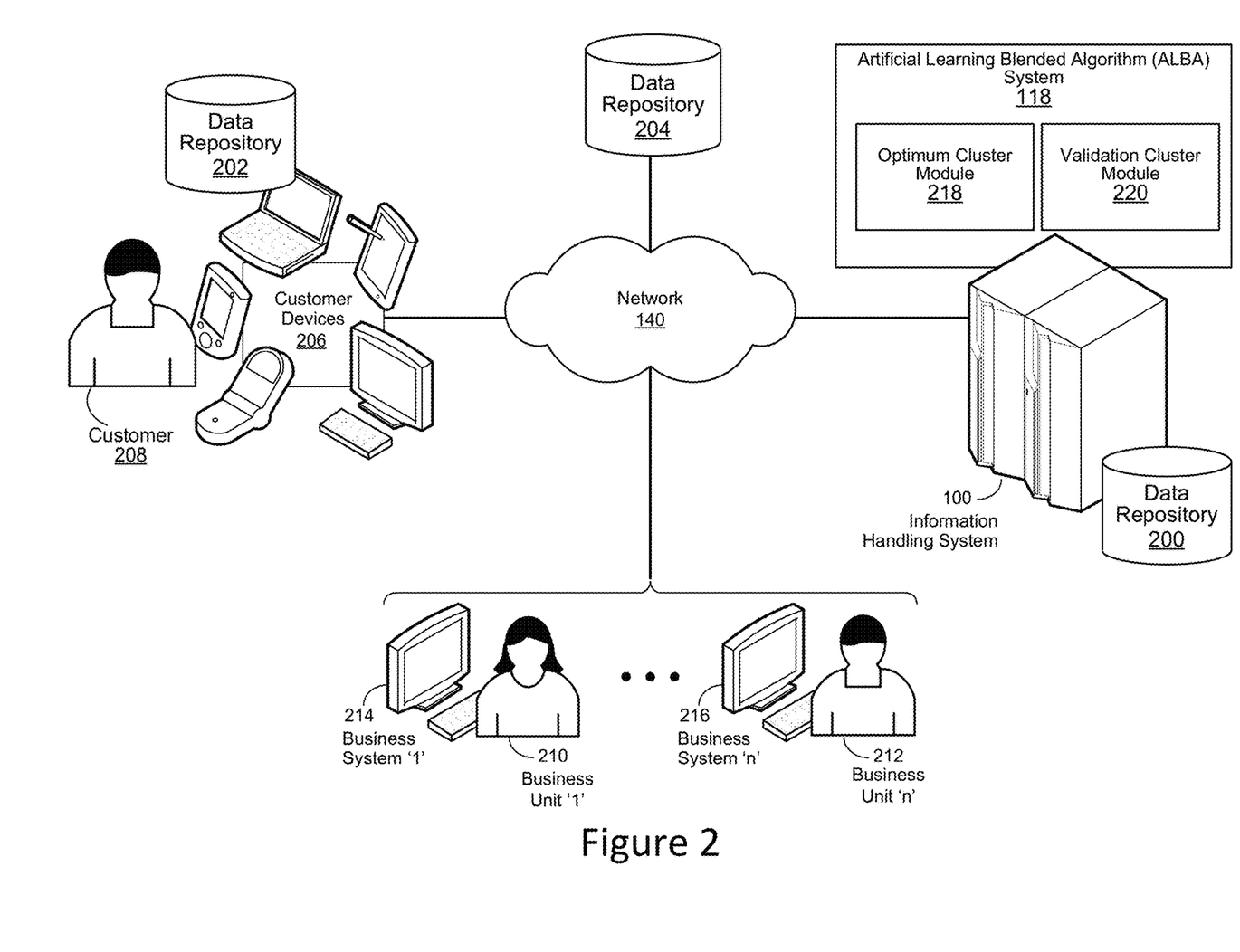
FIG. 2 is a simplified block diagram of a multi-level voice search system.

FIG. 2 is a simplified block diagram of an artificial learning blended algorithm (ALBA) system implemented in accordance with an embodiment of the invention for segmentation analysis. In various implementations, the ALBA system 118 accesses various data repositories as represented by data repository 200, data repository 202, and data repository 204. It is to be understood that data repositories 200, 202, and 204 can include multiple data storage, data memories, databases, etc. Data repositories 200, 202 include groups of information or data, such as datasets. In certain implements such information or data is processed by the ALBA system 118 for data analysis. In particular, the ALBA system 118 performs segmentation analysis.

In the example shown in FIG. 2, the data repository 200 resides on or is configured to the information handling system 100. The ALBA system 118 can directly access data repository 200. Data repository 202 resides on or is configured to customer device(s) 206. The customer devices 206 can be used by customer 208, where customer 208 can be representative of multiple customers. As used herein, customer device(s) 206 refers to an information handling system such as a personal computer, a laptop computer, a tablet computer, a personal digital assistant (PDA), a smart phone, a mobile telephone, or other device that is capable of communicating and processing data. Data repository 202 and customer device(s) 206 can be accessed by the ALBA system 118 through network 140, where network 140 can include one or more wired and wireless networks, including the Internet. In certain implementations, data repository 204 is representative of one more data repositories that are located at various environments, including the World Wide Web, cloud storage, etc. Data repository 204 can be accessed by the ALBA system 118 through network 140, where network 140 can include one or more wired and wireless networks, including the Internet.

In certain implementations, the ALBA system 118 through information handling system 100 is accessed by various business units as represented by business unit '1' 210 through business unit 'n' 212. Communication by business unit '1' 210 through business unit 'n' 212 can be through network 140 through respective business system '1' 214 through business system 'n' 216. In certain implementations, business unit '1' 210 through business unit 'n' 212 represented various business functions, such as sales, marketing, customer support, finance, etc. Furthermore, business unit '1' 210 through business unit 'n' 212 can support customer(s) 208. In particular, business unit '1' 210 through business unit 'n' 212 access data relevant to customer(s) 208. In certain implementations, the ALBA system 118 provides a user interface (UI) to the business unit '1' 210 through business unit 'n' 212 that can include providing status and interactive tabs or buttons such as "upload file", "distribution pot", "clustering", etc.

In certain implementations, the ALBA system 118 includes an optimum cluster module 218 and a validation cluster module 220. In general, the ALBA system 118 is configured to provide end to end solutions through a platform, for segmentation analysis by integrating various segmentation methods and models to process data, including cleansing data, detecting data anomalies, and determining an optimal number of data clusters for a given data set.

Segmentation includes developing a structure to a data set by assigning data points to clusters. For clustering algorithms, determining the number of clusters can be a prerequisite. In certain implementations, the optimum cluster module 218 determines an optimum number of clusters for use by such clustering algorithms. There can be different algorithms to determine an optimum number of clusters; however, different algorithms can provide different results.

The optimum cluster module 218 can be configured to calculate an optimum number of clusters for a given data set using multiple metrics. Such methods or indices (metrics) can be used to determine a number of optimal number of clusters. For example, such methods or indices can determine the optimal number of clusters based on "maximum value of the index", "maximum difference between hierarchy levels of the index", "maximum value of second differences between levels of the index", "maximum difference between hierarchy levels of the index", "maximum value of second differences between levels", "maximum difference between hierarchy levels of the index", "minimum value of second differences between levels", "minimum value of the index", "number of clusters such that critical value is greater than or equal to a value alpha", "maximum value of the index", "maximum difference between hierarchy levels of the index", "minimum value of the index", and "graphical method". For example, the optimum cluster module 218 can be configured to provide aggregation results with a comprehensive distribution of possible optimal number of clusters; ranks a number of clusters based on number of different methods or indices recommending the number of clusters; provide an optimal number of clusters on the data set based on a majority of the number of recommended number of clusters by the methods or indices; and provide an ability for user input (i.e., business decision) to be a factor or an override in determining the optimum number of clusters.

The validation cluster module 220 can be configured to determine weighted values of different validation techniques. In certain implementations, the validation cluster module 220 implements a combination of different multi-criteria decision making techniques. For example, such techniques can include ELECTRE (ELimination Et Choix Traduisantla Realité) and TOPSIS (Technique for Order Preference by Similarity to Ideal Solution). In determining weight, various factors can be considered. For example, three factors can be considered, performance measures, processing speed, and algorithm limitation. For example, performance measures and processing speed can be decided after experimenting with multiple random data sets. In certain implementations, performance measures and processing speed may be directed to an objective, such as when performance measures are given more weight over processing speed. Algorithm bindings (i.e., associating algorithms) can also be taken into consideration, such as the reproducibility and complexity of the algorithm.

Consideration can be taken as to drawbacks of different validation techniques. For example, the Dunn Index technique involves greater computational costs as the number of clusters or the dimensionality of data increases. The Dunn Index technique also can have difficulty in handling noise data. The Davies-Bouldin Index technique provides good results for distinct groups; however, the Davies-Bouldin index is not designed to accommodate overlapping clusters. The Silhouette index is only able to identify the first choice and therefore should not be applied to data sets with sub-clusters.

In order to overcome the limitations of the index techniques (e.g., Dunn, Davis-Bouldin, and Silhouette), an ensemble method (i.e., combining/considering different algorithms) can be applied to the index techniques. In this example, the various criteria have been identified to rank each validation index in terms of providing a weight. For example, "performance measure" is given a weight of 0.5, processing weight is given a weight of "0.3", and algorithm bindings is given a weight of "0.2." In certain implementations, processing speed can be taken into account with similarly configured machines, using the same data set to determine which algorithm provides the solution in the fastest time.

In certain implementations, the ELECTRE method is used to determine a weight for pairwise comparison between the Davies-Bouldin Index, Dunn Index, and Silhouette Index. For example, a normalized decision matrix can be calculated, and a concordance index and a discordance index developed to measure how many criteria are not in favor of each index technique. In certain instances, the Silhouette Index ranks first, Bouldin Index ranks second and Dunn Index ranks third.

In other implementations, TOPSIS is applied to further to rank the three different index techniques. In certain instances, by measuring the distance between the positive and negative ideal solution, a determination is made that Silhouette Index ranks first, the Dunn Index ranks second, and the Bouldin Index ranks third.

In consideration of the results, with the implemented criteria, a maximum weight is given to the Silhouette Index since it is determined to be the best validation method according to both multi-criteria decision-making techniques. The validation techniques then may be given final weights as follows, Silhouette Index with a weight of 0.50, Dunn Index with a weight of 0.25, Bouldin Index with a weight of 0.25. Therefore, in finding the best clustering algorithm, a determination is made as to weightage range which will minimize intra-cluster distance and maximize inter-cluster distance between segments.

Figure 3:
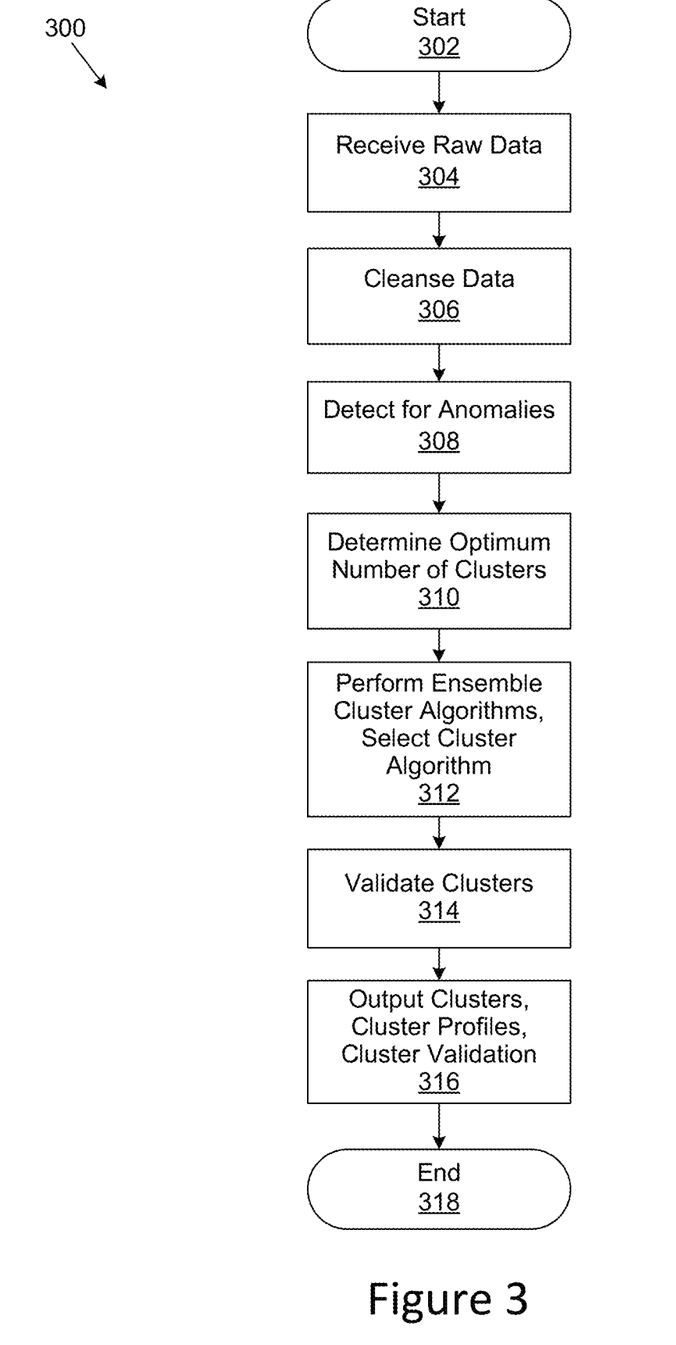
FIG. 3 is a generalized flowchart for segmentation analysis.

FIG. 3 is a generalized flowchart 300 for segmentation analysis. In various embodiments, the artificial learning blended algorithm (ALBA) system 118 is implemented. In particular, the process can be performed in determining a clustering algorithm. The order in which the method is described is not intended to be construed as a limitation, and any number of the described method blocks may be combined in any order to implement the method, or alternate method. Furthermore, the method may be implemented in any suitable hardware, software, firmware, or a combination thereof, without departing from the scope of the invention.

In performing the process, various considerations are accounted for. For example, characteristics of data are considered. Data need not always have distinguishable structure to classify into segments. In most cases, data tends to be of mixed type. For example, data types may be ordinal, nominal, binomial and multinomial. These types of attributes need to be identified and applied necessary transformation to use as desirable distance measure. Identifying impactful data attributes improves accuracy of segmentation analysis. For example, features values of data can have a non-gaussian distribution and data can have skewed distribution leading to an inefficient segmentation and impacting distribution of segmentation groups. Furthermore, determining an optimal number of clusters and selecting the right clustering algorithms are performed.

At block 302, the process 300 starts. At step 304, receiving raw data is performed. The raw data can be received from various data repositories as discussed above in reference to FIG. 2. For example, raw data can be received from customers (customer devices) and respective data repositories, from various wired and wireless networks and connected data stores, and from inter/intra business data stores. Such raw data can be in the form of data sets. At step 306, cleansing is performed on the raw data. Cleansing of data is further described below in reference to FIG. 4. At step 308, detecting for anomalies is performed. Any outliers to the cleansed data are identified, and in certain implementations the location of such outliers is further identified. At step 310, determining an optimum number of clusters is performed. The optimum number of clusters is determined which will be used in performing clustering algorithms. Determining the optimum number of clusters is further described below in reference to FIG. 5. At step 312, performing an ensembled set of clustering algorithms takes place. Various clustering algorithms can be performed, including "K Means", "Fuzzy Means", "K Prototype", "Density based (DB) Cluster", and "M Cluster". At step 314, validation of the clusters is performed, and the best clustering algorithm is determined. Validating the clusters is further described below in reference to FIG. 6. At step 316, output is provided of the clusters, cluster profiles, and cluster validation is performed. Examples of the output are shown in reference to FIG. 7. At block 318, the process ends.

Figure 4:
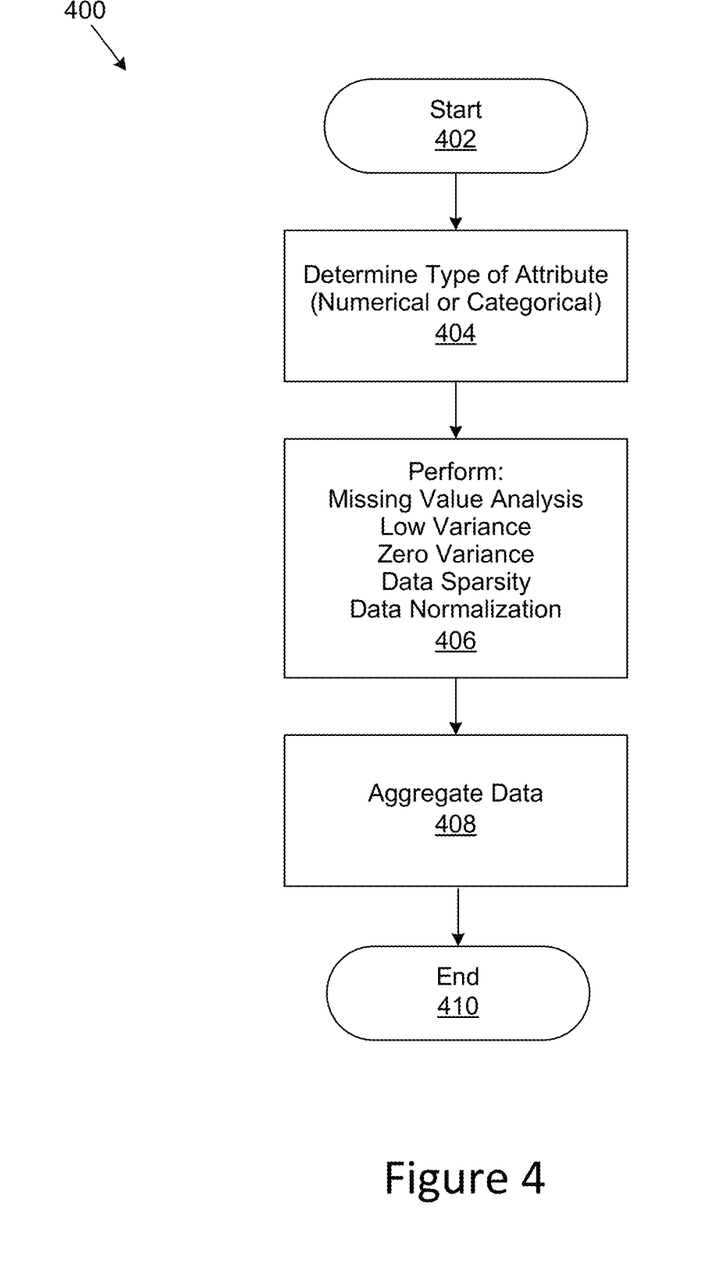
FIG. 4 is a generalized flowchart for cleansing data.

FIG. 4 is a generalized flowchart 400 for cleansing data. The order in which the method is described is not intended to be construed as a limitation, and any number of the described method blocks may be combined in any order to implement the method, or alternate method.

At block 402, the process starts. At step 404, a determination is made as to the attribute of the raw data. The determination can be whether the data is numerical data or categorical data. At step 406, the following can be performed: missing value analysis which determine if the data is complete; low variance; zero variance, determination of data sparsity, and data normalization. At step 408, aggregating the data is performed.

Figure 5:
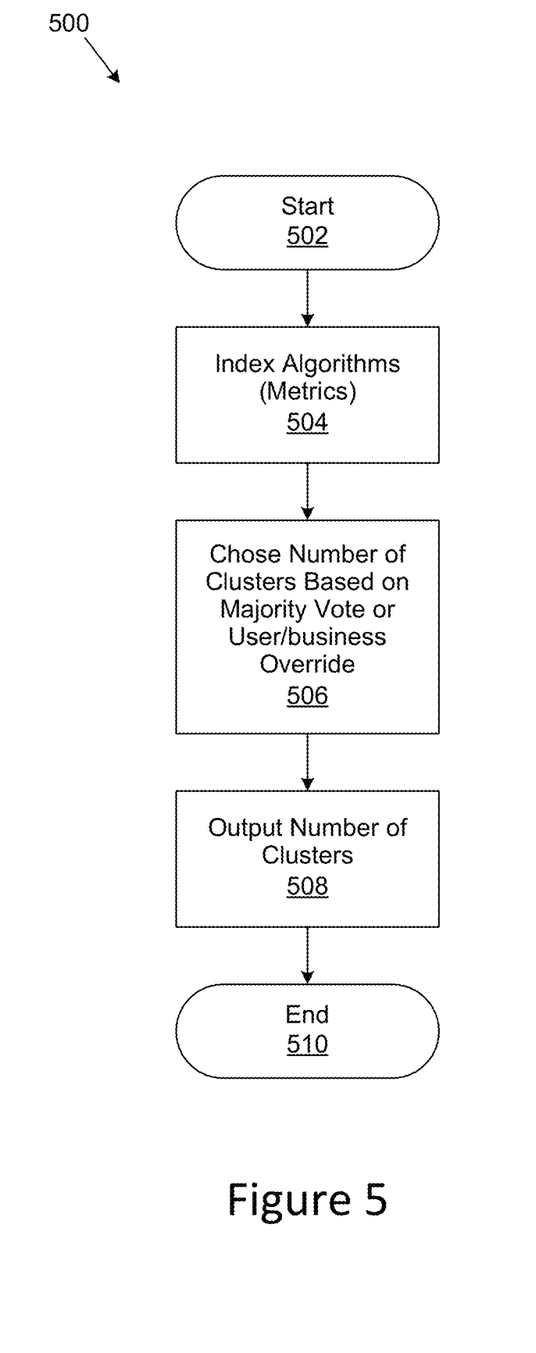
FIG. 5 is a generalized flowchart for determining an optimum number of clusters.

FIG. 5 is a generalized flowchart 500 for determining the optimum number of clusters. The order in which the method is described is not intended to be construed as a limitation, and any number of the described method blocks may be combined in any order to implement the method, or alternate method.

At block 502, the process starts. At step 504, indexing of a set of clustering algorithms is performed. Various clustering algorithms can be chosen and implemented. At step 506, the clustering algorithms are performed. An optimum number of clusters is chosen based on a criteria, such as the number of clusters that are determined by the majority of the clustering algorithms. In certain implementations, a business or user decision can override the determination, where the user or business determines the number of clusters. At step 508, the number of clusters is provided/output. At block 510, the process ends.

Figure 6:
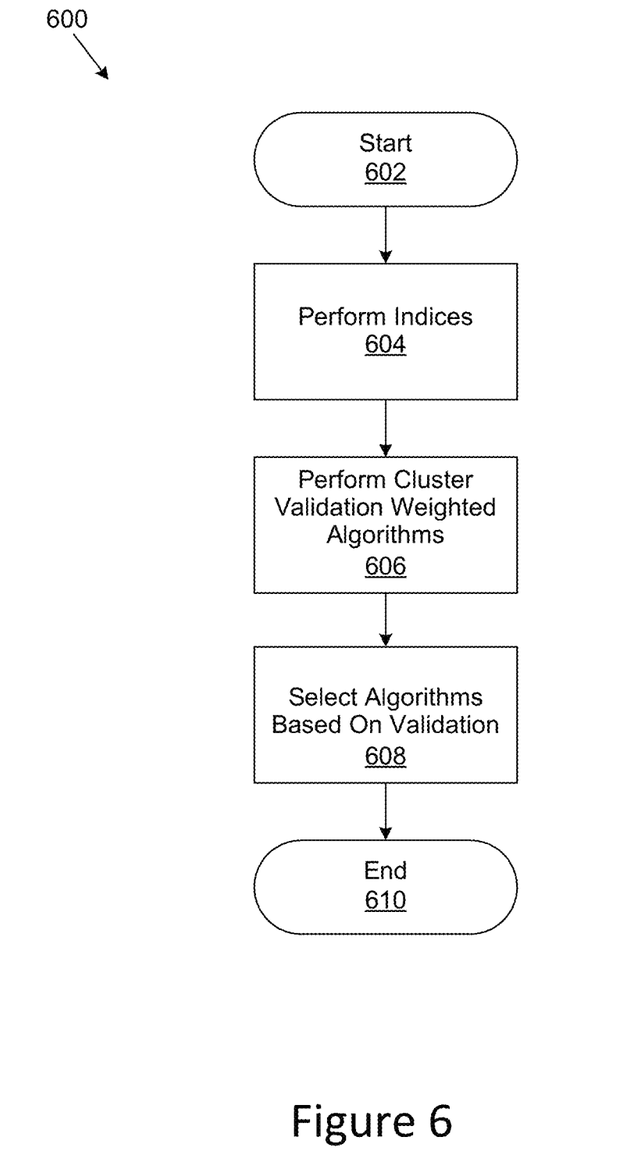
FIG. 6 is a generalized flowchart for validating clusters.

FIG. 6 is a generalized flowchart 600 for validating clusters. The order in which the method is described is not intended to be construed as a limitation, and any number of the described method blocks may be combined in any order to implement the method, or alternate method.

At block 602, the process starts. At step 604, indices are performed. In specific, index techniques are performed. As discussed, the Dunn Index technique involves greater computational costs as the number of clusters or the dimensionality of data increases. The Dunn Index technique also can have difficulty in handling noise data. The Davies-Bouldin Index technique provides good results for distinct groups; however, the Davies-Bouldin index is not designed to accommodate overlapping clusters. The Silhouette index is only able to identify the first choice and therefore should not be applied to data sets with sub-clusters. In certain implementations, weighting is performed as described above in reference to FIG. 2. In certain implementations, a two validation is performed using the ELECTRE method and TOPSIS method as described above in reference to FIG. 2. At step 608, a clustering algorithm is chosen based on the cluster validation. At block 610, the process ends.

Figure 7A:
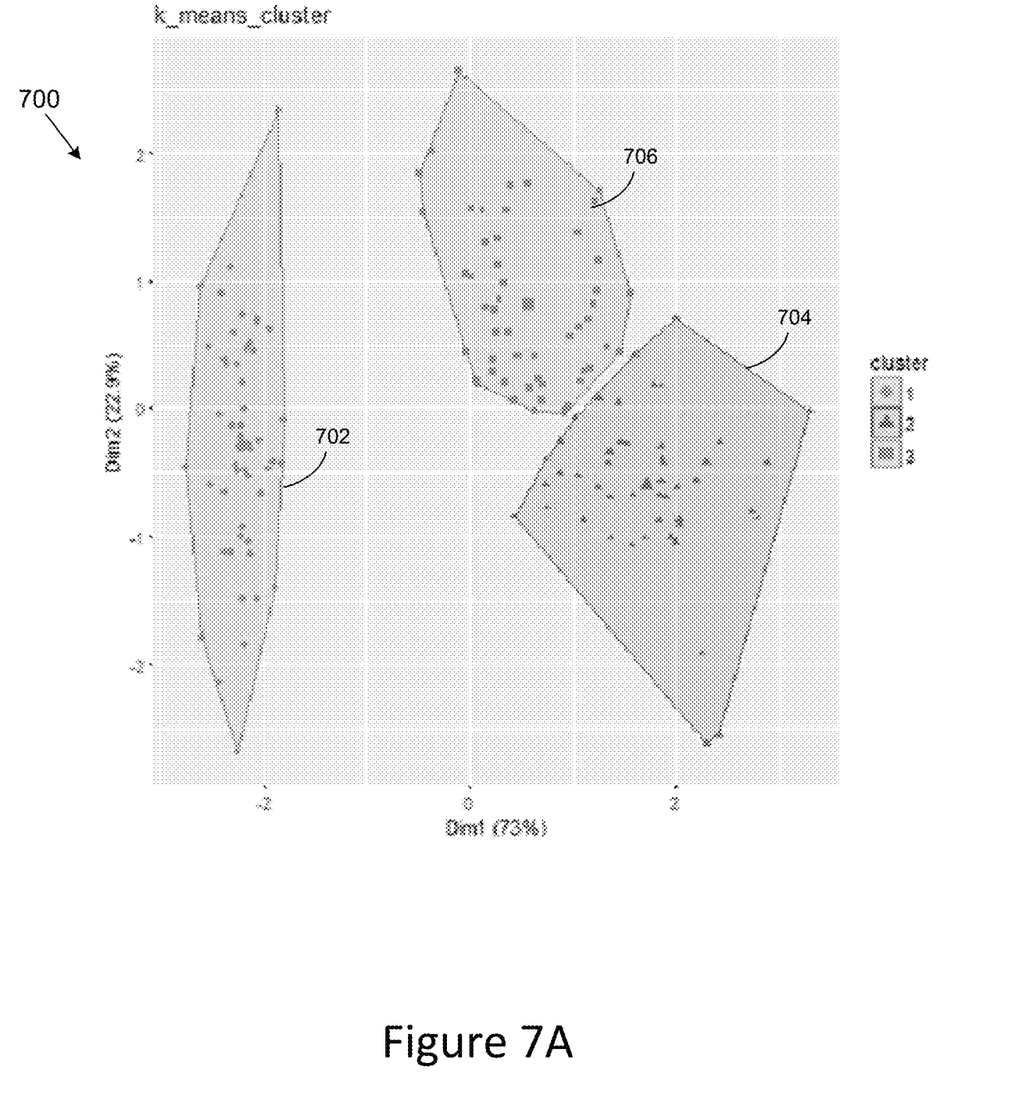
FIGS. 7A and 7B, generally referred to herein as FIG. 7, are example outputs for a segmentation analysis.
Figure 7B:
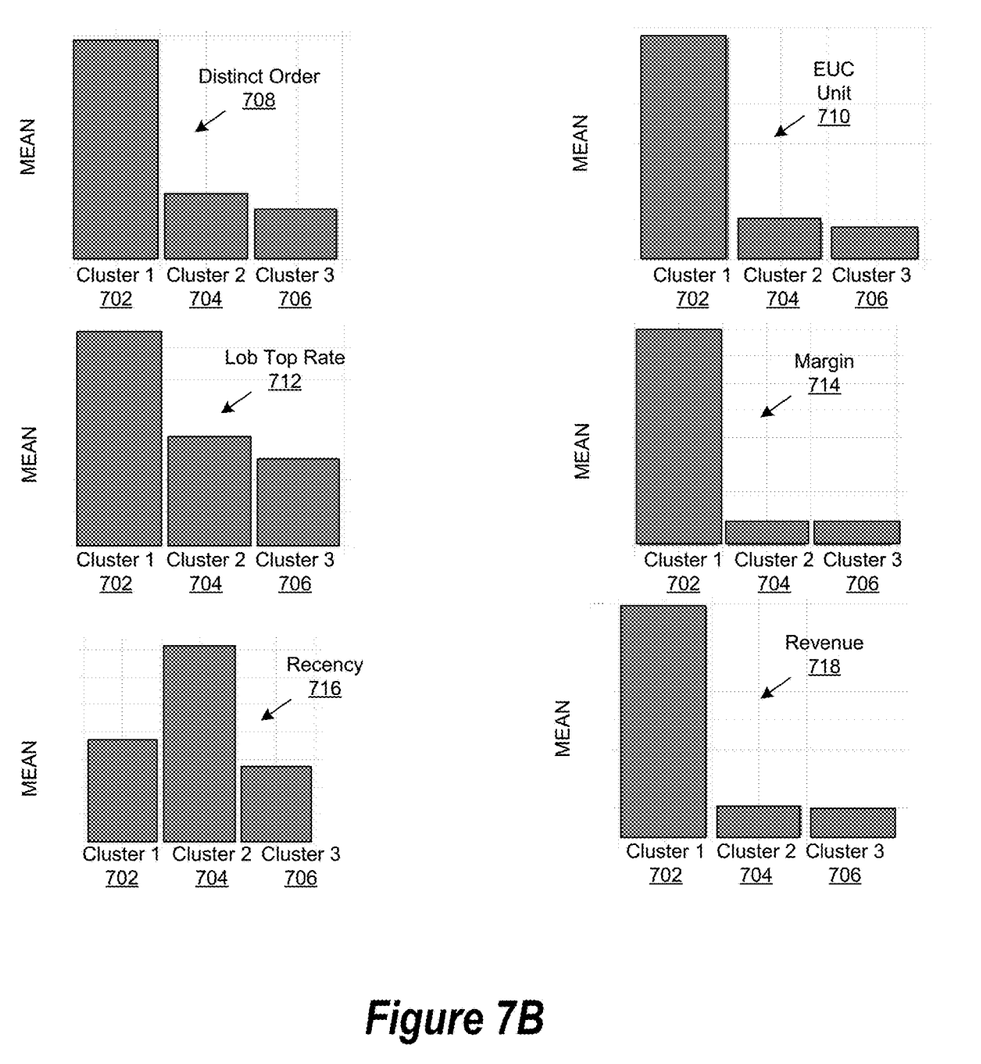

FIG. 7 shows examples of outputs for a segmentation analysis. The examples 700 can be provided through a user interface (UI) to users or business unit '1' 210 through business unit 'n' 212 when implementing the artificial learning blended algorithm (ALBA) system 118. One of the outputs 700 can include a plot of clusters. In this example, three clusters are identified as cluster 1 702, cluster 2 704, and cluster 3 704 on a plot. In this example, a determination is made that three (3) is the optimum number of clusters. Distribution of the three clusters, cluster 1 702, cluster 2 704, and cluster 3 704, can be shown by segment profiles per specific categorization. In this example, the segment profiles are Distinct Order 708, EUC unit 710, Lob Top Rate 712, Margin 714, Recency 716, and Revenue 718, As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for segmentation analysis:
    providing through an artificial learning blended algorithm (ALBA) system, user interfaces to business units to provide status as to data sets;
    determining an optimum number of clusters of the data sets by an optimum cluster module of the ALBA system for multiple clustering algorithms;
    aggregating results of the multiple clustering algorithms with a possible optimal number of clusters;
    ranking a number of clusters based on a number of clustering algorithms recommending the number of clusters;
    determining optimum number of clusters for a given data set is based on a majority of the multiple clustering algorithms;
    performing the multiple clustering algorithms of the data sets by the ALBA system using the determined optimum number of clusters; and
    validating the cluster algorithms of the data sets by a validation cluster module of the ALBA system using different index validation techniques to determine a best clustering algorithm, wherein the validation cluster module is configured to determine weighted values of different validation techniques, wherein weighted values is determined based weighted averages as to predetermined factors that include performance measures, processing speed, and algorithm limitation; ranking index validation techniques in terms of the weighted averages; and the best clustering algorithm is determined based on the ranked index validation techniques and weightage range that minimize intra-cluster distance and maximize inter-cluster distance.

2. The method of claim 1, wherein the multiple metrics include methods or indices based one or more of: maximum value of an index, maximum difference between hierarchy levels of the index, maximum value of second differences between levels of the index, maximum difference between hierarchy levels of the index, maximum value of second differences between levels, maximum difference between hierarchy levels of the index, minimum value of second differences between levels, minimum value of the index, number of clusters such that critical value is greater than or equal to a value alpha, maximum value of the index, maximum difference between hierarchy levels of the index, minimum value of the index, and graphical method.

3. The method of claim 1, wherein the determining optimum number of clusters is a number determined by a user or business.

4. The method of claim 1, wherein the validating the cluster algorithms using index validation techniques further comprises implementing a multi-step validation algorithm to the index validation techniques.

5. The method of claim 1 further comprising receiving raw data and cleansing the raw data.

6. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for improved management of unattended user queries and comprising instructions executable by the processor and configured for:
        providing through an artificial learning blended algorithm (ALBA) system, user interfaces to business units to provide status as to data sets;
        determining an optimum number of clusters of the data sets by an optimum cluster module of the ALBA system for multiple clustering algorithms;
        aggregating results of the multiple clustering algorithms with a possible optimal number of clusters;
        ranking a number of clusters based on a number of clustering algorithms recommending the number of clusters;
        determining optimum number of clusters for a given data set is based on a majority of the multiple clustering algorithms;
        performing the multiple clustering algorithms of the data sets by the ALBA system using the determined optimum number of clusters; and
        validating the cluster algorithms of the data sets by a validation cluster module of the ALBA system using different index validation techniques to determine a best clustering algorithm, wherein the validation cluster module is configured to determine weighted values of different validation techniques, wherein weighted values is determined based weighted averages as to predetermined factors that include performance measures, processing speed, and algorithm limitation; ranking index validation techniques in terms of the weighted averages; and the best clustering algorithm is determined based on the ranked index validation techniques and weightage range that minimize intra-cluster distance and maximize inter-cluster distance.

7. The system of claim 6, wherein the multiple metrics or indices, are based on one or more of: maximum value of an index, maximum difference between hierarchy levels of the index, maximum value of second differences between levels of the index, maximum difference between hierarchy levels of the index, maximum value of second differences between levels, maximum difference between hierarchy levels of the index, minimum value of second differences between levels, minimum value of the index, number of clusters such that critical value is greater than or equal to a value alpha, maximum value of the index, maximum difference between hierarchy levels of the index, minimum value of the index, and graphical method.

8. The system of claim 6, wherein the validating the cluster algorithms using index validation techniques further comprises implementing a multi-step validation algorithm to the index validation techniques.

9. The system of claim 6 further comprising receiving raw data and cleansing the raw data.

10. A non-transitory, computer-readable storage medium embodying computer program code, the computer program code comprising computer executable instructions configured for:
    providing through an artificial learning blended algorithm (ALBA) system, user interfaces to business units to provide status as to data sets;
    determining an optimum number of clusters of the data sets by an optimum cluster module of the ALBA system for multiple clustering algorithms;
    aggregating results of the multiple clustering algorithms with a possible optimal number of clusters;
    ranking a number of clusters based on a number of clustering algorithms recommending the number of clusters;
    determining optimum number of clusters for a given data set is based on a majority of the multiple clustering algorithms;
    performing the multiple clustering algorithms of the data sets by the ALBA system using the determined optimum number of clusters; and
    validating the cluster algorithms of the data sets by a validation cluster module of the ALBA system using different index validation techniques to determine a best clustering algorithm, wherein the validation cluster module is configured to determine weighted values of different validation techniques, wherein weighted values is determined based weighted averages as to pre-determined factors that include performance measures, processing speed, and algorithm limitation; ranking index validation techniques in terms of the weighted averages; and the best clustering algorithm is determined based on the ranked index validation techniques and weightage range that minimize intra-cluster distance and maximize inter-cluster distance.

11. The non-transitory, computer-readable storage medium of claim 10, wherein the multiple metrics include methods or indices based one or more of: maximum value of an index, maximum difference between hierarchy levels of the index, maximum value of second differences between levels of the index, maximum difference between hierarchy levels of the index, maximum value of second differences between levels, maximum difference between hierarchy levels of the index, minimum value of second differences between levels, minimum value of the index, number of clusters such that critical value is greater than or equal to a value alpha, maximum value of the index, maximum difference between hierarchy levels of the index, minimum value of the index, and graphical method.

12. The non-transitory, computer-readable storage medium of claim 10, wherein the determining optimum number of clusters is a number determined by a user or business.

13. The non-transitory, computer-readable storage medium of claim 10, wherein the validating the cluster algorithms using index validation techniques further comprises implementing a multi-step validation algorithm to the index validation techniques.

14. The non-transitory, computer-readable storage medium of claim 10 further comprising receiving raw data and cleansing the raw data.

\* \* \* \* \*